July 1, 1941.   W. S. THIMBLETHORPE   2,247,974
ELECTRIC STOVE
Filed July 21, 1939   5 Sheets-Sheet 2

Inventor:
Wilfred Sylvester Thimblethorpe
By Spear, Donaldson & Hall
Attys.

July 1, 1941.                W. S. THIMBLETHORPE                2,247,974
                                  ELECTRIC STOVE
                              Filed July 21, 1939          5 Sheets-Sheet 3

Inventor:
Wilfred Sylvester Thimblethorpe
By Spear, Donaldson & Hall
        Attys.

July 1, 1941.  W. S. THIMBLETHORPE  2,247,974
ELECTRIC STOVE
Filed July 21, 1939   5 Sheets-Sheet 4
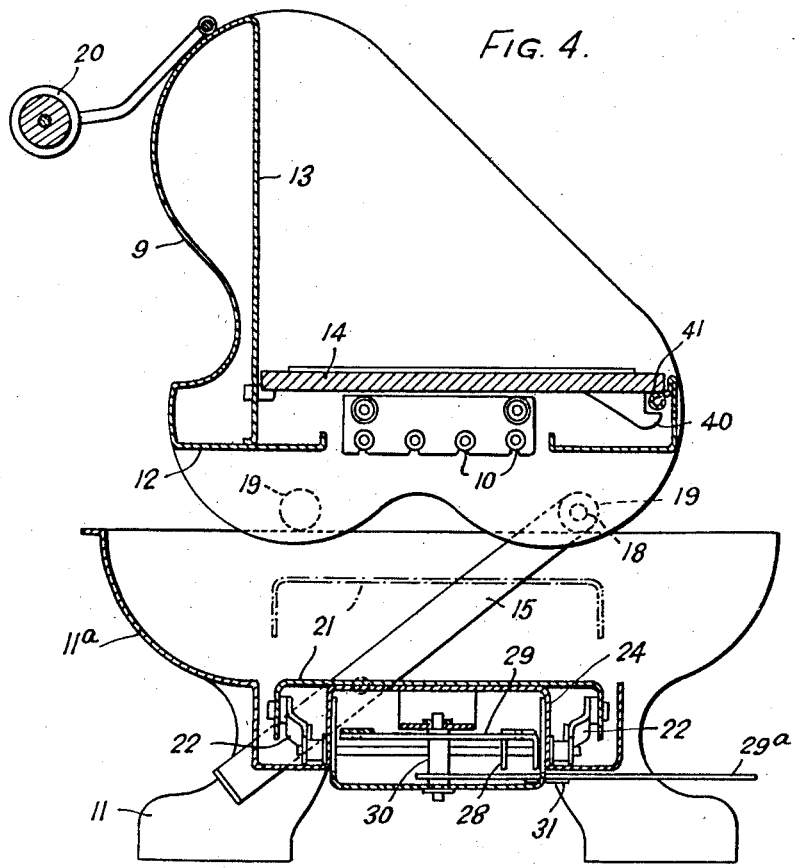
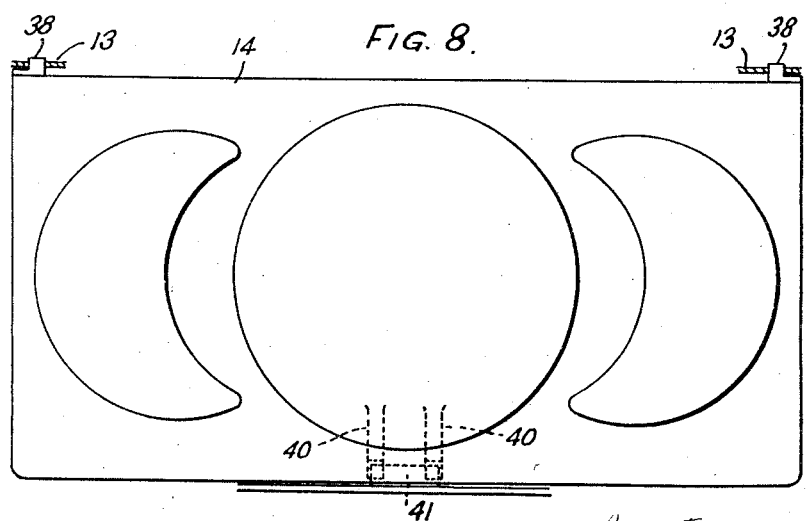

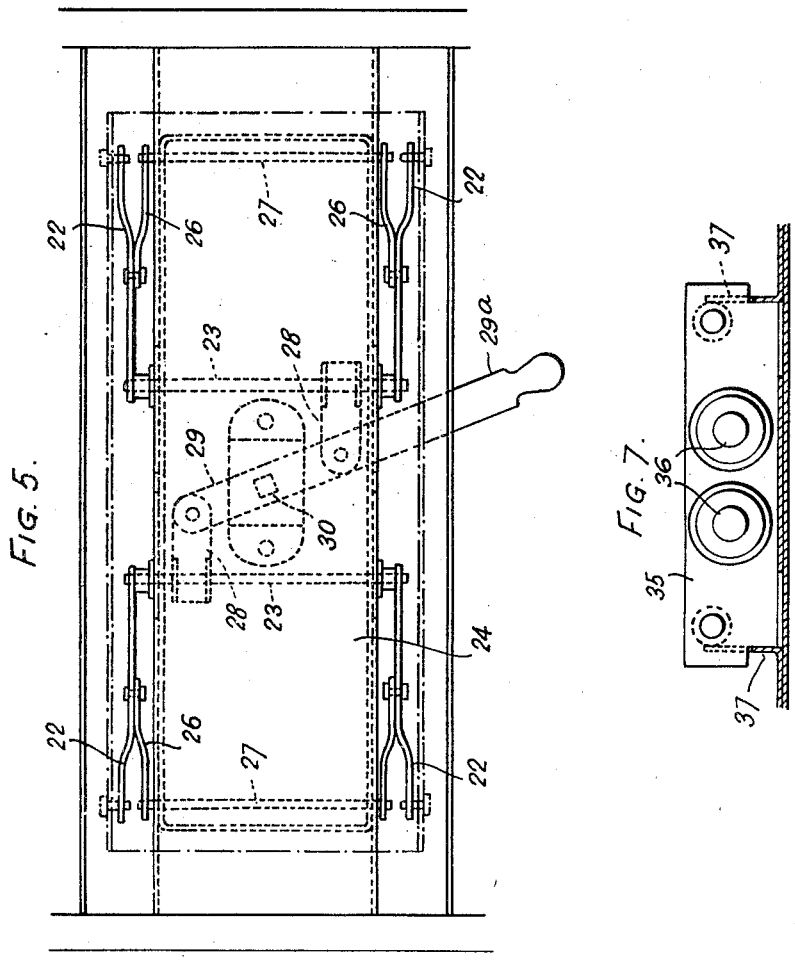

Patented July 1, 1941

2,247,974

UNITED STATES PATENT OFFICE 2,247,974

ELECTRIC STOVE

Wilfred Sylvester Thimblethorpe, London, England

Application July 21, 1939, Serial No. 285,785
In Great Britain September 22, 1938

4 Claims. (Cl. 219—19)

This invention relates to electric stoves.

One object of the invention is to provide a stove which has the appearance of a conventional type of heating stove for warming a room, for example, but which can readily be converted into a cooking stove including a hot plate for boiling and a grill.

Another object of the invention is to provide an electric stove in which the heating element can be used for heating a boiling plate while at the same time cooking food arranged beneath the boiling plate.

Another object of the invention is to provide an electric stove in which a single heating element can be used for boiling and grilling simultaneously.

Another object of the invention is to provide a combined electric heating and cooking stove which is economical to manufacture and readily portable.

Another object of the invention is to provide a combined electric heating and cooking stove in which the change from the heating to the cooking position and vice versa can be accomplished readily by a simple lifting and swinging action without the necessity of handling any parts of the stove other than a lifting handle attached thereto.

Another object of the invention is to provide a combined electric heating and cooking stove comprising a hood carrying the heating element and a hot plate and mounted on a trough-like base, the hood and the base being connected by pivoted links so that the relative positions of the hood and base may readily be changed.

In a preferred arrangement a heat retaining plate or the like is fitted in the stove adjacent to the electric heating element in such a manner that when used as a heating stove the element lies in front of the plate or the like and when it is desired to convert the stove into a hot plate or cooking stove the mounting allows the heating element and the heat retaining plate or the like to be moved into a position wherein the plate or the like is horizontal or substantially so with the heating element underneath, the plate or the like then forming a hot plate support for cooking or boiling vessels.

When in this latter position if it is not desired to use the space beneath the element for grilling a suitable plate may be inserted beneath the element to reflect the heat into the hot plate to facilitate the heating or boiling of the vessels therein.

This inserted plate may be suitably mounted in the base of the stove and operated by a handle so that it can be raised and lowered at will. In the lowered position it may serve as a rest for a pan or the like when the space beneath the element is used for grilling or cooking. In this latter case it is, of course, necessary to have the underside of the heating element exposed to the food to be grilled.

Further the arrangement is preferably such that the change from the heating to the cooking positions of the stove and vice versa is accomplished by a simple movement without the necessity of manipulating or separately changing or handling any individual parts of the stove. It will be understood that when the stove is in use for warming a room the grill and hot plate device are effectively concealed.

To enable the invention to be fully understood it will now be described by reference to the accompanying drawings, in which:

Fig. 4 is a sectional end elevation of the stove arranged in the boiling or cooking position;

Fig. 5 is a sectional plan view on line 5—5 of Fig. 3;

Figs. 6 and 7 are views of details of the heating element drawn to a larger scale, and Fig. 8 is a plan view of one form of heat-retaining or hot plate used in the stove.

Figure 1:
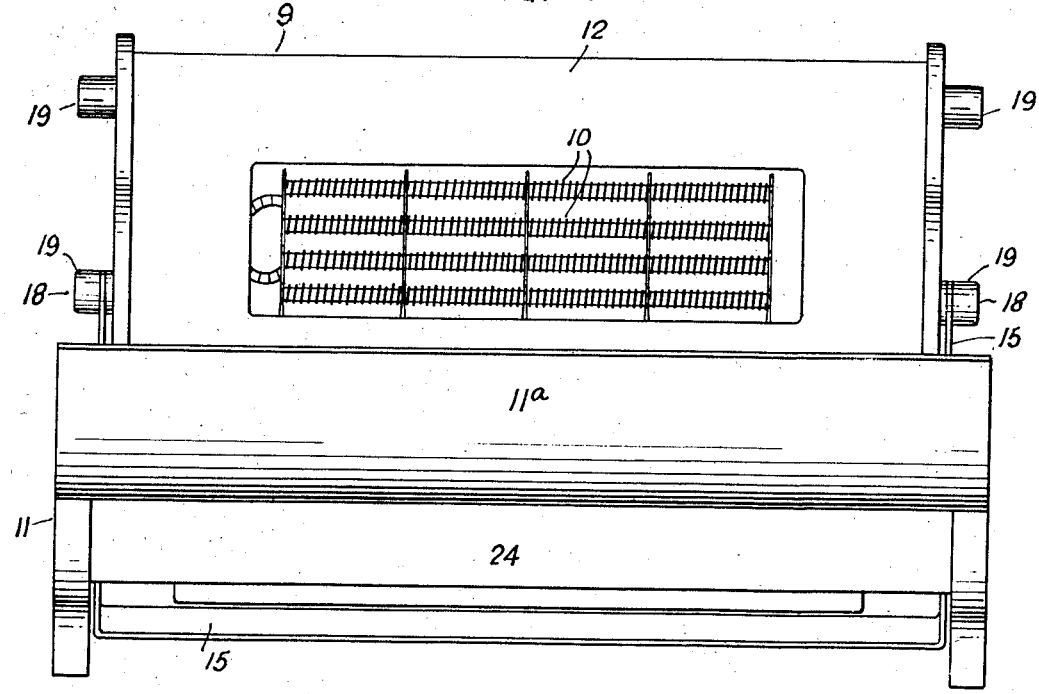
Fig. 1 is a front elevation.

As shewn in Figs. 1–4 the stove comprises two main parts: an upper part in the form of a hood or surround 9 in which the heating element 10 is mounted and a base part 11 of trough-like form in which the hood 9 is movably mounted and supported. The base has a back 11a but no front wall. The hood 9 is so arranged that when the stove is used for warming a room as in Figs. 1 and 2 it rests on the base 11 with the heating element 10 inclined at a suitable angle. The hood is fitted with a cover plate 12 having an opening to expose the heating element to the air and suitable spaces are provided so that air can circulate around the element. The interior of the hood may also be provided with a liner plate 13 which may be burnished or polished to act as a heat reflector (Fig. 4).

A heat-retaining plate 14 is mounted in the hood behind the element 10.

The hood 9 is pivotally connected to the base 11 by a U-shaped link 15 which is pivotally mounted at the points 16 on the side walls of the base the ends of the U being pivoted to the hood at the points 18. Any other suitable pivoting arrangement or link connection between the parts 9 and 11 may be used. The sides of the hood 9 are fitted with lugs 19 and a handle 20 is also provided.

Figure 2:
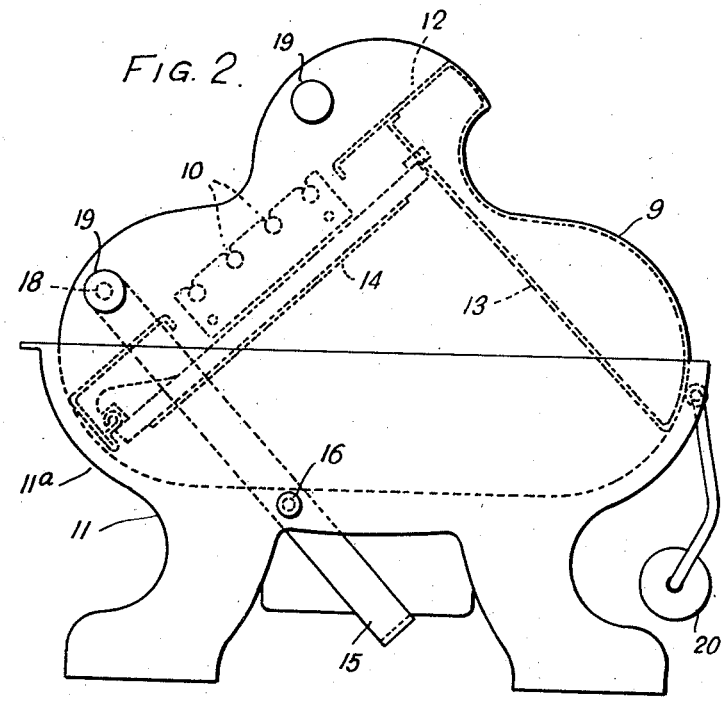
Fig. 2 is an end elevation of one form of electric stove constructed according to the invention arranged in the room warming or heating position.

Figs. 1 and 2 shew the stove in use as a room heater. When it is desired to use the stove as a hot plate, boiler or cooker the hood 9 is raised by means of the handle 20 to the extent allowed by the link 15 and is swung rearwardly and turned about the link pivots and then lowered until it rests with the lugs 19 engaging the tops of the end plates of the base 11 as clearly shewn in Figs. 3 and 4.

In this position the heat-retaining or boiling plate 14 is horizontal with the heating element 10 directly below it and cooking vessels can be placed on the plate within the confines of the hood as will be understood.

Further a considerable space is left beneath the element 10 and as the front of the base is open grilling pans or the like can be inserted below the element and the stove used for simultaneous boiling and grilling. In this connection an adjustable tray or support may be arranged in the base below the heating element. This, as shewn, comprises a tray 21 mounted on pairs of links 22 pivoted on rods 23 arranged in a casing 24 mounted on the base (Figs. 3 and 4), the rods being slidable in slots 25 in the sides of the casing. The links 22 are anchored to the casing by links 26 pivoted on rods 27 in the casing. The rods 23 are connected by links 28 to a lever 29 secured to a pivot 30, a projecting handle 29a being also attached to the pivot and having a lug 31 on its underside adapted to engage ratchet teeth 32 formed on an edge of the slot 33 in the side of the casing through which the handle projects.

Figure 3:
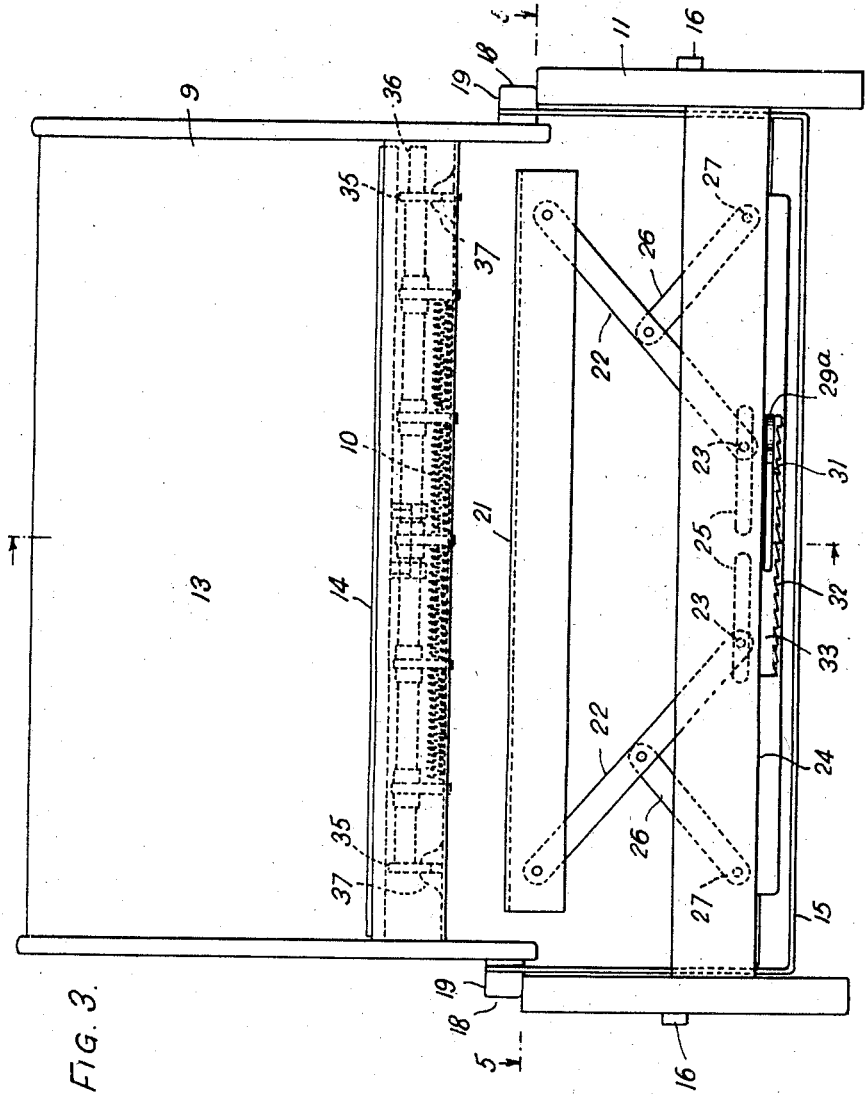
Fig. 3 is a front elevation.

By moving the handle about its pivot the tray can be raised or lowered and held in the desired position by the lug 31 engaging the teeth 32. Fig. 3 shews the tray in the raised position and Fig. 4 shews it in the lowered position, the raised position being indicated in dotted lines. When the stove is being used as a hot plate or simply for boiling vessels on the plate 14 it is advisable to raise the tray 21 into position adjacent to the heating element to direct the heat into the plate 14. If desired a separate reflecting plate may be provided for this purpose adapted to be moved into or out of position by hand.

Obviously a loose tray may be employed or the adjusting arrangement illustrated modified or changed in any suitable manner. The tray may be replaced by a movable plate and the hood may be fitted with means for sliding the plate into and out of position beneath the heating element when it is desired to reflect the heat up into the boiling plate. It will be noted that the plate 14 is immediately behind the heating element so that when the stove is being used for room warming, heat is continually being stored in the plate. If then the power is cut off and the hood is turned into the cooking position of Fig. 4 the plate 14 will be sufficiently heated to act as a hot plate for some time without the necessity of turning on the power.

Figure 6:
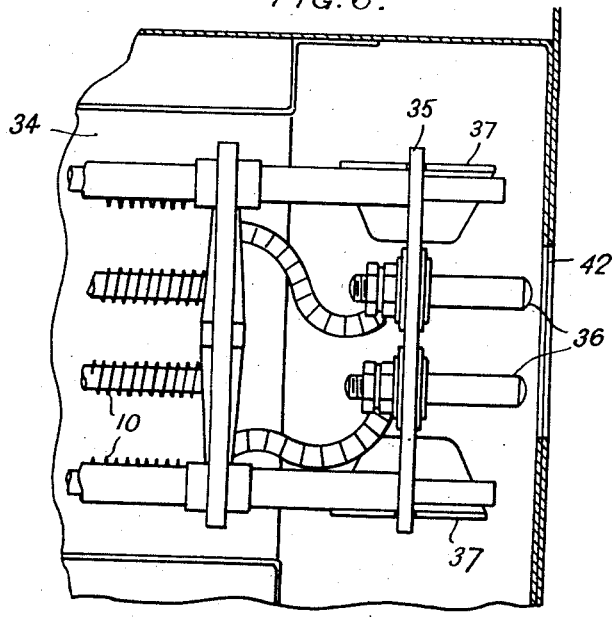

Any suitable form of heating element may be used. As shewn the element consists of a series of resistance coils 33 electrically connected in suitable manner and carried in a holder frame 34 of refractory material. Figs. 6 and 7 shew one method of mounting the holder. In these figures the ends of the side bars of the holder are connected by a plate 35 which carries the insulated terminals 36 and the plate is supported in a pair of forked or slotted members 37 attached to the underside of the cover plate 12 of the hood. The other end of the holder is similarly mounted except that there are no terminals. The holder is held in position by the plate 14 which as shewn in Figs. 4 and 8 rests at the back on lugs 38 on the reflecting plate 13 while the front of the plate 14 is provided with two spaced lugs 40 adapted to engage below a projection 41 on the edge of the cover plate 12. The lugs are suitably shaped so that when the plate is inserted and pressed down they will snap over the projection 41 which is sufficiently resilient and then engage beneath it or into suitable holes. A slot (not shewn) may be provided in the front of the cover plate 12 so that a tool can be introduced between the lugs 40 and the edge of the plate 14 prised upwards to enable it to be removed to obtain access to the heating element.

Various types of heat-retaining plate may be used either of metal or other refractory material and the plate may be in the form of a grid. An easily detachable plate (not shewn) of vitreous enamel corresponding to the plate 12 may be provided which can be secured in position to protect the plate 12 from the splashes of grease which may occur when the stove is used for grilling.

In the arrangement illustrated the power plug is connected to the terminals 36 through an opening 42 in one side of the hood but the connection may be arranged at any other suitable point in the hood or base. The usual electric switches for controlling the power and the heating elements have not been illustrated as it will be understood that any suitable switches may be employed, together with any desired form of heating element with or without means for varying the number of elements in use as is well known in connection with electric stoves. It will be noted that the heat-retaining plate or the like is held in position by a resilient snap-action locking means without the use of any other fastenings.

The heating element may be protected by a perforated screen or quartz plate or in any other usual manner. While the whole stove is preferably made of metal certain parts such as the end plates of the hood and base may be of other material such as artificial resin or the substance known under the registered Trade-Mark "Bakelite."

The general design of the stove lends itself to quantity reproduction in pressed metal at a very low cost.

I claim:

1. An electric stove comprising in combination a movable hood or carrier member, an electric heating element mounted in said hood or carrier, a heat absorbing and radiating plate mounted in said hood or carrier adjacent to said heating element and in substantially parallel relation therewith, a base for supporting said hood or carrier, and connecting means between said movable carrier and base enabling the carrier to be swung to a position in which the heating element underlies the plate in substantially horizontal position, and is covered by the plate to heat the plate for cooking or boiling purposes, and to be swung to a position in which the heating element is exposed to the atmosphere to be heated at an inclination for air warming purposes with the plate in back of said heating element, said hood being of generally triangular shape in cross section, said heating element and plate being disposed at or forming one side of said triangular cross-section hood, said hood resting on said side on the base in the said horizontal position of said heating element with the plate above it, and said hood resting on another side of said triangular shaped hood on said base in the air warming position of said heating element inclined upwardly with the plate beneath or behind it, said heating element and plate being substantially inverted in the turning of said generally triangular shaped hood from one position to the other on said base, said connecting means comprising link means pivoted to the base and to the hood, the pivotal connection of the link means to the hood being adjacent one corner of the triangular cross section of the hood and the pivotal connection of the link means to the base being at an intermediate point in the width of the base so that the hood may be swung about its pivot and the body thereof rested on the base on one side of said pivot or on the other side of said pivot with simultaneous swinging of the link means about the base pivot thereof to one side of said base pivot or the other side thereof.

2. An electric stove comprising in combination a movable hood or carrier member of generally triangular shape in cross-section, an electric heating element and a heat absorbing and radiating plate mounted in said hood or carrier in juxtaposed substantially parallel relation with each other and being disposed at or forming one side of said triangular cross-section hood, a horizontally disposed base for supporting said hood or carrier, connecting means between said movable hood and base comprising link means pivoted to the base at an intermediate point in the width of the base and to the hood at said side of said triangular cross-section and adjacent said juxtaposed element and plate, enabling the carrier or hood to be swung to a position in which said hood rests on its said side on the base with the heating element underlying the plate and in horizontal position to heat the plate for cooking, and to be swung to a position in which said triangular hood rests on another of its sides on the base with the heating element outermost and inclined upwardly with the heat retaining plate beneath or behind it for room heating purposes.

3. In an electric stove according to claim 2, said base being of trough shape and said link means being pivoted to said base within the recess therein, and substantially concealed within the trough-shaped base in either adjusted position of the hood.

4. In an electric stove according to claim 2, and in combination, lugs on the outer sides of the hood ends, said link means comprising a U-shaped link member, the ends of which are pivoted to the hood as described at the ends of the hood, and the sides of which U-shaped link member are pivoted to the ends of the base intermediate the width thereof as described, said lugs being disposed to rest on the ends of said base in the horizontal cooking position of said plate with the heating element beneath it.

WILFRED SYLVESTER THIMBLETHORPE.